Aug. 21, 1956   J. HERTRICH   2,759,372
HEAVY CENTRIFUGAL DRIVE ORGANIZATION
Filed July 2, 1953   2 Sheets-Sheet 1
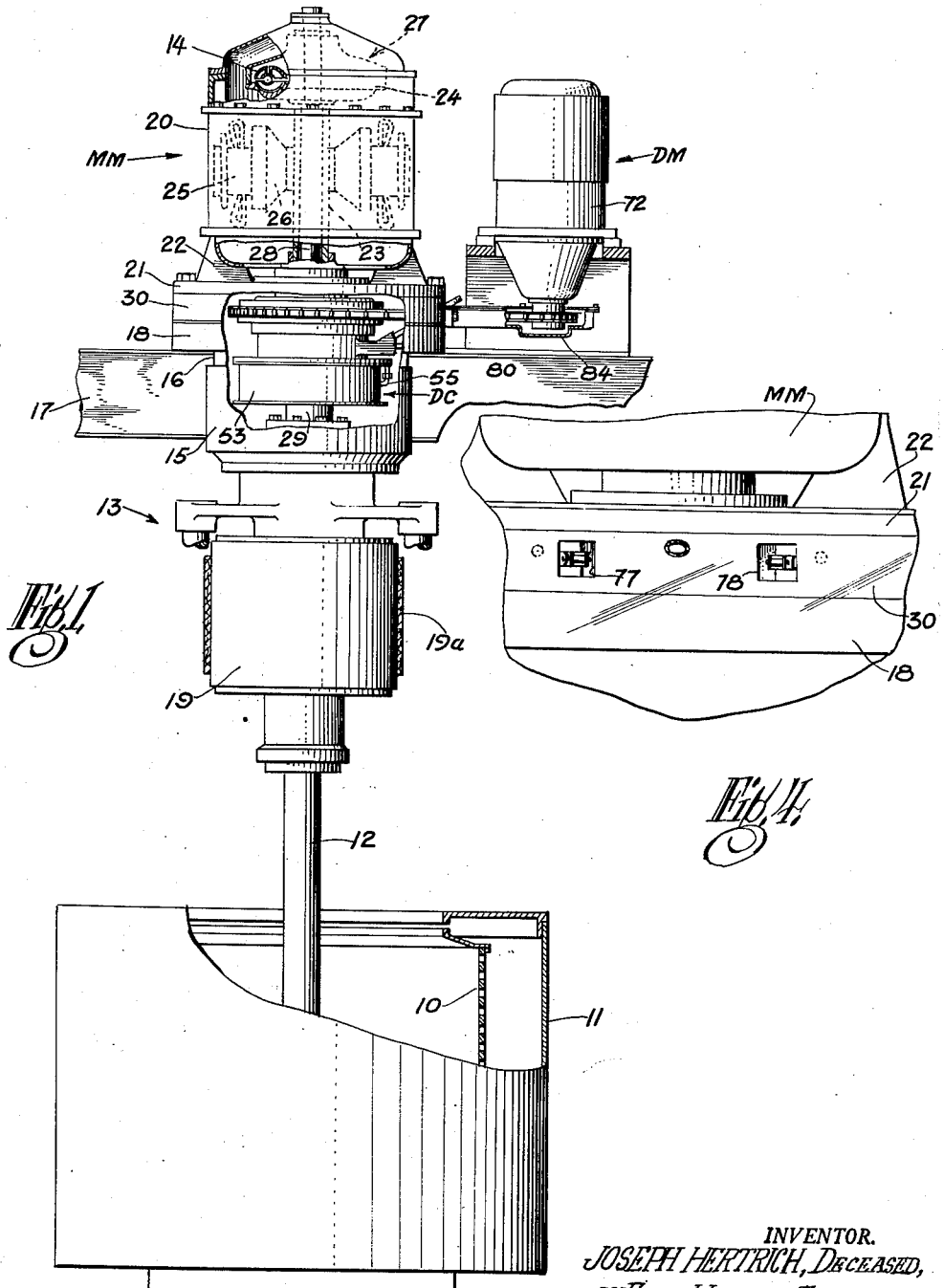
INVENTOR.
JOSEPH HERTRICH, DECEASED,
BY ELISE HERTRICH, EXECUTRIX.
BY Pollard and Johnston
ATTORNEYS

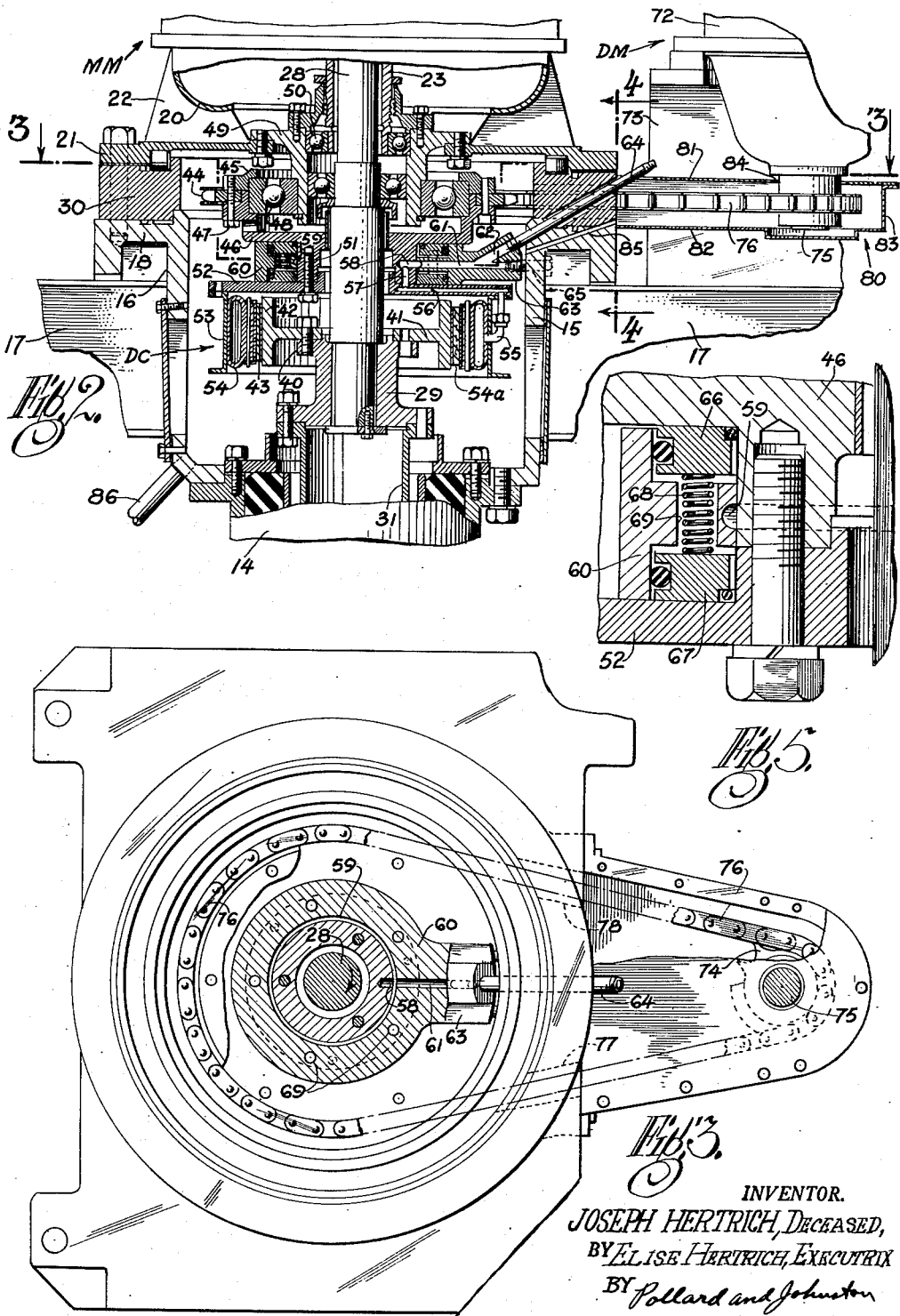

United States Patent Office 2,759,372
Patented Aug. 21, 1956

2,759,372

HEAVY CENTRIFUGAL DRIVE ORGANIZATION

Joseph Hertrich, deceased, late of Hamilton, Ohio, by Elise Hertrich, executrix, Hamilton, Ohio, assignor to The Western States Machine Company, Hamilton, Ohio, a corporation of Utah Application July 2, 1953, Serial No. 365,737

8 Claims. (Cl. 74—665)

This invention relates to new and useful improvements in centrifugal apparatus and particularly to driving systems for heavy duty suspended centrifugals of the type employed in the manufacture of sugar.

An object of this invention is to provide new and useful improvements in driving systems for centrifugal machines that are driven by a rotary motor wherein driving torque is transmitted by a variable torque slip clutch, for example a hydraulic coupling, which make it easier for the operator to bring the machine to suitable discharging speed, and which reduce or eliminate the influence of the operator's attentiveness and skill upon the efficiency of the discharging operation.

A more particular object is to provide improvements in driving systems of such centrifugal machines, by which the machines may be safely and readily brought and held at the end of the spinning period to a slow constant speed suitable for discharging.

Another object of this invention is to provide a practical low speed drive for fluid drive centrifugal machines which can be readily installed in new and in various present plant arrangements, without altering either the main driving or driven units of such machines, and which is adaptable for use with the same supporting structure as is used for conventional motor driven centrifugals. A special feature of the invention lies in its compact organization, by which the low speed drive may be associated with the main drive in a unitary arrangement, without increasing the space requirements of the machine.

Other objects of this invention are to provide such low speed drives for fluid drive centrifugals that will reduce the operating requirements of the main driving motor and that will enable the discharging torque of the machine to be selected within a desirable range of values so as to allow the same machine to be used with maximum effectiveness with different types of materials.

According to this invention, these and other objects are achieved by the provision of a low speed slip drive in the driving system of a centrifugal machine having a prime mover with slip coupling to transmit driving torque to the basket driving shaft to rotate the basket to high speeds for spinning operations. The present invention utilizes an embodiment of the low speed slip drive disclosed in my co-pending application Serial No. 90,040, filed June 14, 1949, now United States Patent No. 2,667,974. The low speed drive is adapted to be arranged in space available within the confines of conventional supporting structure of known machines of the type, and is operative upon the basket driving shaft after each spinning period to bring and hold the basket to a low constant speed suitable for discharging. The drive may be arranged to apply torque to the basket driving shaft either in the direction of spin, when used with machines having discharger shoes operable only in the high speed direction of basket rotation, or in the reverse direction, when used according to the invention of said copending application as part of a machine having a discharger operable only when the basket is slowly rotated in a direction opposite to the normal spinning direction. By such an organization the main driving motor may be provided with power characteristics unlimited by any need for low speed discharging action and the low speed drive can be selected to give constant speed and torque characteristics.

According to preferred embodiments of the invention, the low speed slip drive includes a variable torque slip clutch within the confines of the hanger supporting the centrifugal head of the machine, which is operative to transmit torque from a low speed rotary motor outside the hanger to the basket driving shaft. The clutch includes a driven member fixed to the basket driving shaft for rotation therewith at all times and a driving member in driving relation to the driven member, a driving connection between the driving member and the low speed rotary motor being effected by a suitable drive through side openings in a special adapter plate adapted to lie between the upper, motor supporting part of the hanger and the base of the main centrifugal driving motor. The adapter plate rests on top of the hanger and forms a seat thereon for the main motor, which may correspond to the motor base seat formed on top of the motor supporting part of the hanger. In this way a low speed slip drive is provided for fluid drive centrifugals, without alteration of the main driving unit or the driven unit of the machine.

Other objects, features and advantages of the invention will become apparent from the following detailed description and the accompanying drawings of an illustrated embodiment thereof.

In the drawings:

Figure 1 is a front elevation, partly in vertical cross section and partly broken away, showing an assembled centrifugal machine embodying this invention;

Figure 2 is a fragmentary view, partly in vertical cross section and partly in elevation, showing details of a low speed drive assembly according to the invention;

Figure 3 is a horizontal section, with some parts being broken away, taken along line 3—3 of Figure 2;

Figure 4 is a fragmentary side elevation of a motor base adapter plate, viewed along line 4—4 of Figure 3; and Figure 5 is a detail view, in vertical section and on an enlarged scale, of portions of a sealing ring unit shown in Figure 2.

As seen in the drawings, the preferred embodiment includes the usual perforate basket 10 disposed within a surrounding stationary curb 11 and rotatably carried by a spindle 12, which suspends the basket from a gyratory head, indicated generally at 13. The latter includes a stationary hanger 16 which carries the weight of the basket and spindle and depends from a fixed frame 17. The hanger, which may be of the type commonly used for known motor driven centrifugals, is formed at its upper end with a horizontally extending motor base supporting part 18 which rests on the frame, and a hollow head supporting part 15 which extends downwardly through an opening in the frame 17 for supporting the head 13. A brake drum 19 is carried with spindle 12 and is adapted to be engaged by brake shoes 19a, which are movable against the drum to decelerate the spindle assembly.

An electric motor designated MM, preferably a two-speed induction motor having high speed and low speed windings, serves as the main drive for the basket spindle. The motor casing 20 is supported in vertical position on top of motor base support 18 by motor base 21 formed on the lower end of motor skirt 22 and bolted to the motor base support through special adapter plate 30, which serves both to seat known motor bases on conventional motor base supports and to provide access to the interior of the hanger, for a purpose described hereinafter without modifying the construction of either the motor structure or the hanger.

The motor includes a stator 25 fixed to casing 20 and a rotor 26 carried by a hollow rotor shaft 23, which extends upwardly to a driving connection with a variable torque slip clutch. The slip clutch employed may be a suitable variable torque mechanical clutch or a standard hydraulic coupling, but is preferably a hydraulic clutch of the type disclosed in either of my prior United States Letters Patent 2,380,595 and 2,441,356. The hydraulic coupling, indicated at 27, has a housing-impeller 24 drivingly connected with motor shaft 23 and a runner or driven member 14 enclosed therein, which is fixed to a shaft 28 for rotation therewith. The latter is solid and extends downwardly within the hollow rotor shaft 23. At its lower end shaft 28 is positively connected with basket spindle 12 through a hub 29 keyed to the shaft, a hollow hub extension 31, and a suitable flexible coupling (not shown) within the hanger and head, the latter enabling the spindle and basket to gyrate in known manner during operation of the machine.

It will be understood that when the motor MM is energized and the coupling 27 is activated, the motor will transmit torque to shaft 28 for rotation in a clockwise direction, as viewed in Fig. 3. Shaft 28, when so actuated, turns the basket 13 at low speed during charging and at high speed during centrifuging, in the direction indicated by the arrow in Fig. 3. Torque transmission may be controlled by means (not shown) regulating the amount of fluid in the coupling, either in accordance with torque developed by the coupling or in accordance with the torque reaction of the motor, as disclosed in my aforesaid Patents 2,380,595 and 2,441,356, respectively.

The treated solids remaining in the basket after centrifuging are removed by the action of a suitable mechanical discharger (not shown) while the basket is rotated slowly by the discharge drive mechanism. The discharger may be of the type shown and may be organized with other elements of the machine as disclosed and claimed in my aforementioned co-pending United States application Serial No. 99,040.

In the illustrated form, the discharge drive includes a comparatively small, low speed motor DM which may be conveniently located adjacent the main motor in parallel spaced relation thereto, and a friction clutch DC disposed within the confines of the hanger 16 and connected with the low speed motor unit in the manner described hereinafter. In the lower portion of the hanger, the hub 29, which connects the main motor driven shaft 28 with the basket spindle 12, is formed at its upper end with a flange 40, to which is bolted a spider 41 carrying a friction drum 42. Arranged on a level with the adapter 22 is a sprocket wheel 44 carried between upper and lower ring members 45 and 46, the sprocket wheel and two ring members being held in assembled relation by bolts 47. The sprocket wheel assembly runs freely on a bearing 48 mounted in a fixed bearing support 49. The latter is secured to motor base 21 and surrounds the main motor drive shaft 28, carrying a thrust bearing 50 to sustain the axial thrust of the main motor rotor and shaft. The lower ring member 46 has an axially and downwardly extending hub 51 which carries a clutch wheel 52. A circular rim 53 depends from wheel 52 and lies concentrically around friction drum 42. Fixed around the inner periphery of ring 53 is a hollow expansible ring 54 which is fluid pressure operated and carries internal friction elements 54a movable against the friction drum by action of the expansible ring member 54.

It is to be understood that the expansible member 54 is normally deflated and that in this condition the friction elements 54a do not engage friction drum 43. When member 54 is inflated or expanded by the action of compressed air introduced thereinto, the friction elements are moved into engagement with drum 43. The torque transmitted by the clutch may be varied by adjustment of the clutch-activating pressure within member 54.

Expansible ring member 54 is connected by an air line 55 with a radial duct 56 in clutch wheel 52. Duct 56 has a port in registry with one end of an axial duct 57 in hub 51, the other end of duct 57 opening into a radial duct 58 which is in registry with an annular channel 59 at all times. Channel 59 is formed in a stationary collar 60 surrounding hub 51 between clutch wheel 52 and ring member 46. The collar 60 has a radial passage 61 opening inwardly into channel 59 and outwardly into a radial extension 62 formed in a neck portion 63 of the collar for connection with an air line 64. The latter extends through a bore in the adapter plate 30 to a suitable control valve (not shown) outside the hanger 16, which is connected with a source of fluid under pressure and regulates flow of pressure fluid to and from the ring member 54. The collar 60 may be held stationary by pin 65 which extends through the motor base support wall and is received in a suitable cavity in the neck portion 63.

As clearly shwon in Fig. 5, axially aligned annular ring seals 66 and 67 are provided to seal the space between rotating element 46 and collar 60 on one side of the channel 59 and to seal the space between the rotating clutch wheel 52 and collar 60 on the opposite side of channel 59, respectively. The seals are held firmly against the rotating elements under the force of compression springs 68 disposed in circular series of openings 69 in collar 60.

Sprocket wheel 44 within hanger 16 may be driven by discharge motor DM outside the hanger in the following manner. Motor casing 72 is supported in a raised position on frame 17 by a supporting structure 73. The motor drives a sprocket 74 fixed to the lower end of the discharge motor shaft 75 and positioned on a level with adapter plate 30 and sprocket wheel 44. The latter is driven by an endless chain 76 passing over sprockets 44 and 74 and through spaced openings or slots 77 and 78 in the adapter plate 30.

It will be evident from the foregoing that the present invention provides a very practicable, low speed drive unit which may be installed readily in new and various existing fluid drive centrifugal machines, without altering either the main driving unit or the driven unit of such machines and without increasing the space requirements of such machines.

The slip action of the friction clutch DC effects gradual engagement of its driving and driven members so that the low speed drive can bring the basket gradually to its discharging speed without being overburdened by the inertia of the loaded basket. In this way discharge motor DM may be a small standard electric motor having suitable speed and horsepower characteristics, without requiring special starting torque characteristics. Such slip action also makes it practical and possible for the low speed drive to act safely on the basket shaft at any speed within a wide range to bring the basket positively to discharging speed, thereby reducing the operating time of each cycle for it is no longer necessary to decelerate the basket shaft below a critical low limit. In addition, the low speed motor may be selected with a power capacity sufficient to sustain any loads to which the motor may be subjected in the uses of the machine, while the actual low speed driving torque desired to meet the needs for any particular use may be obtained by adjustment of the clutch activating pressure.

At the completion of the centrifuging period, the basket may be brought to a suitable low speed for discharging the treated solids by decelerating the basket and activating the discharge drive in the following manner.

Deceleration from high speed may be effected by friction braking, regenerative braking, or preferably a combination of the two. In case where the main motor MM is employed for regenerative braking, the motor is switched from its higher to its lower speed, preferably by suitable automatic control means such as described in my aforesaid co-pending application, Serial No. 99,040, to subject the main motor shaft to the retarding action of the low speed motor field. After a suitable interval of regenerative braking, motor MM may be completely disconnected by inactivating fluid coupling 27 in known manner, and the basket may thereafter be mechanically braked by engaging brake shoes 19a with brake drum 19 for completing deceleration. As the basket approaches or reaches the end of the deceleration period, the friction brake shoes 19a may be released and the discharge drive may be activated for bringing and holding the basket 10 to a constant slow speed suitable for discharging. The discharge drive is activated by energizing motor DM and introducing the required air pressure into expansible member 54. The time lag associated with the build-up of pressure in member 54 exceeds the time required for the motor to reach its full speed so that the motor does not become loaded until it is in condition to sustain the load.

In some cases, if a sufficiently heavy-duty discharge motor and clutch are employed, the low speed discharge drive may act as a substitute for the friction brake, and may be activated at the end of the regenerative braking period to decelerate the basket and bring it to discharge speed. Where the main motor has no regenerative braking facilities, the heavy-duty clutch and discharge motor may be activated at the end of the spinning period to serve as a regenerative brake as well as to bring the basket to a low constant discharging speed. It will be evident that when fluid coupling 27 is inactivated, motor MM may continue to be rotated at its lower speed, or it may be stopped and restarted from cycle to cycle.

A further feature of this invention lies in the provision, in combination with the above apparatus, of an enclosure 80 which underlies discharge motor DM and surrounds chain 76. Enclosure 80 includes two parallel plates 81 and 82, which extend horizontally on opposite sides of the chain and in spaced relation thereto from the adapter plate to points slightly beyond sprocket 74. The end of the enclosure adjoining the adapter plate is open, and a vertical transverse member 83 bridges the space between the free marginal edges of the plates to complete the enclosure. The upper plate 81 is formed with an opening 84 to receive the projecting end of discharge motor shaft 75 and to permit oil drippings to fall into the enclosure. This enclosure serves not only as a guard for chain 76 but also serves as an oil drip pan for discharge motor DM, passing oil collected through a passage 85 into the hanger 16. A discharge pipe 86 communicates with the bottom of the hanger 16 to draw off the drippings from both the main motor and auxiliary motor. It will be seen that this provides a simple and effective means for automatically maintaining the chain and sprocket drive cleanly lubricated at all times.

It is to be understood that the detailed description and the accompanying drawings are illustrative and that the improvements herein disclosed may be embodied in various forms of construction within the scope of the appended claims.

What is claimed is:

1. In a heavy cyclical centrifugal machine having a spindle, a solids-retaining basket carried on the spindle for rotation with it, a rotary high speed centrifugal driving means including a motor mounted in a vertical position above said spindle, and a driven shaft connected with said driving means and extending through said hanger for connection at its lower end in driving relation with said spindle, a stationary motor supporting hanger, an adapter to lie between said hanger and the base of said motor for supporting the motor on said hanger, said adapter having an opening therein at one side, a rotary slip clutch mechanism within the confines of said hanger having a driven member fixed to said driven shaft to rotate therewith and a driving member freely rotatable about said shaft, said driving and driven members normally being uncoupled, driving means outside the confines of said hanger having a driving connection with said driving member through said adapted opening for rotating said driving member at a low speed, and means to couple said driving and driven members for bringing and holding said driven shaft to a low speed suitable for discharging the basket.

2. In a heavy cyclical centrifugal machine having a vertical basket-carrying spindle, a rotary high speed centrifugal driving means including a motor mounted in a vertical position above said spindle, a stationary motor supporting hanger, and a driven shaft connected with said driving means and extending vertically through said hanger for connection in driving relation with said spindle, an adapter to lie between said hanger and the base of said motor for supporting the motor on said hanger, said adapter having an opening therein at one side, a friction clutch within the confines of said stationary hanger including a friction drum connected for rotation with said driven shaft and a driving member freely rotatable about said driven shaft carrying friction elements movable to engage and disengage said drum, a driving gear connected for rotation with said driving member, driving means outside said hanger having a driving connection with said driving gear through said adapter opening for rotating said driving member at a substantially constant low speed, and means operative for moving said friction elements into slippable engagement with said drum to bring and hold the driven shaft to a low constant speed suitable for operation of a discharger.

3. In a heavy cyclical centrifugal machine having a vertical basket-carrying spindle, high speed centrifugal driving means including a rotary motor mounted in a vertical position above said spindle, a stationary motor supporting hanger, and a driven shaft connected with said driving means and extending vertically through said hanger for connection in driving relation with said spindle, an adapter to lie between said hanger and the base of said motor for supporting the motor on said hanger, said adapter having an opening therein at one side, a friction clutch within the confines of the hanger including a friction drum fixed to said driven shaft for rotation therewith at all times and a driving wheel freely rotatable about said driven shaft carrying friction elements movable radially relative thereto to engage and disengage said drum, radially extensible and retractable fluid pressure responsive means between said wheel and said elements for moving said elements and normally holding the same disengaged from the wheel, a driving gear positioned on a level with the adapter and connected with said wheel for rotating it, a constant speed motor-driven gear outside the hanger having a driving connection through said adapter opening with the driving gear for rotating said wheel and said friction elements at constant low speed, and means for applying fluid pressure to said pressure responsive means so as to engage said friction elements with said drum under predetermined pressure and thereby bring and hold said driven shaft to a low speed suitable for operation of a discharger.

4. In a heavy cyclical centrifugal machine having a vertical basket-carrying spindle, high speed centrifugal driving means including a rotary motor mounted in a vertical position above said spindle, a stationary motor supporting hanger, and a driven shaft connected with said driving means and extending vertically through said hanger for connection in driving relation with said spindle, an adapter to lie between the hanger and the base of said motor for supporting the motor on said hanger, said adapter having an opening therein at one side, a friction clutch within the confines of said hanger including a friction drum connected for rotation with said driven shaft, a driving wheel carrying friction elements movable relative thereto to engage and disengage said drum, a sprocket wheel mounted for free rotation about said driven shaft in the plane of said adapter plate and connected with said driving wheel for rotating it, a constant speed rotary motor having a shaft mounted in parallel spaced relation to said hollow driving shaft, a sprocket fixed to the lower end of said second motor shaft in the plane of said adapter, a chain drive extending through said adapter opening and connecting said sprocket wheel and said sprocket, an enclosure underlying the second motor and surrounding said chain drive and extending from the adapter to points beyond said sprocket so as to enclose that portion of the chain drive outside the hanger, said enclosure having a top opening to receive the second motor shaft and oil drippings from such motor, said enclosure also having fluid connection with the interior of said hanger for passing oil drippings collected into said hanger.

5. For a heavy cyclical centrifugal machine having a vertical basket-carrying spindle, a spindle-driving shaft, a stationary hanger suspending said spindle and surrounding said spindle-driving shaft, and high speed centrifugal driving means mounted above the hanger and having a driving connection with the spindle-driving shaft, a low speed drive for said spindle comprising a slip clutch within the confines of the hanger having a driven member adapted to be connected for rotation with the spindle-driving shaft, a driving member including elements movable radially into and from a driving relation to said driven member, a gear wheel connected with said driving member for rotating it, and a motor-driven gear rotated at a constant speed outside the hanger having a driving connection with said gear wheel for rotating it and said driving member at a constant low speed.

6. For a heavy cyclical centrifugal machine having a vertical basket-carrying spindle, a spindle-driving shaft, a stationary hanger suspending said spindle and surrounding said shaft, and high speed centrifugal driving means mounted above the hanger and having a driving connection with the spindle-driving shaft, a low speed drive for said spindle comprising a friction clutch within the confines of the hanger having a friction drum connected for rotation with the spindle-driving shaft, a driving wheel carrying friction elements movable relative thereto to engage and disengage said drum, fluid pressure responsive means between said wheel and said elements for moving said elements and normally holding the same disengaged from the wheel, a driving gear spaced from and connected for rotation with said driving wheel, a motor-driven gear rotated at constant speed outside the hanger having a driving connection with said driving gear for rotating it at a low speed, and means for applying pressure to the pressure responsive means so as to engage and disengage said friction elements with said drum.

7. An apparatus as described in claim 3, said driving wheel having an annular portion of restricted diameter surrounding said driven shaft between said driving gear and said pressure responsive means, said fluid pressure applying means including a stationary annular member surrounding said annular portion, an annular fluid channel between said annular member and said annular portion, a fluid intake duct extending through said annular member to said channel, and a fluid duct extending from said channel through said wheel to said pressure responsive means.

8. An apparatus as described in claim 7, and resiliently positioned rotary annular sealing means at opposite sides of said channel between said annular member and portions of said wheel at opposite ends of said annular portion.

References Cited in the file of this patent

UNITED STATES PATENTS

| | | |
|---|---|---|
| 1,615,433 | Andrews et al. | Jan. 25, 1927 |
| 1,866,499 | Herr | July 5, 1932 |
| 2,261,914 | Hertrich | Nov. 4, 1941 |
| 2,414,154 | Leef | Jan. 14, 1947 |
| 2,648,213 | Castner | Aug. 11, 1953 |